(12) United States Patent
Gantzer (10) Patent No.: US 9,192,102 B2
(45) Date of Patent: Nov. 24, 2015

(54) AGRICULTURAL HARVESTING MACHINE COMPRISING AN IMPROVED DEVICE FOR GUIDING PLANTS

(71) Applicant: KUHN S.A., Saverne (FR)

(72) Inventor: Christian Gantzer, Woustwiller (FR)

(73) Assignee: KUHN S.A., Saverne (FR)

( * ) Notice: Subject to any disclaimer, the term of this patent is extended or adjusted under 35 U.S.C. 154(b) by 70 days.

(21) Appl. No.: 14/098,869

(22) Filed: Dec. 6, 2013

(65) Prior Publication Data

US 2014/0174051 A1 Jun. 26, 2014

(30) Foreign Application Priority Data

Dec. 20, 2012 (FR) ...................... 12 62381

(51) Int. Cl.
*A01D 43/00* (2006.01)
*A01D 89/00* (2006.01)

(52) U.S. Cl.
CPC .................................. *A01D 89/008* (2013.01)

(58) Field of Classification Search
CPC ... A01D 89/008; A01D 89/006; A01D 89/00; A01D 41/10; A01D 89/007; A01F 15/08
USPC ............................ 56/364, 377, 190
See application file for complete search history.

(56) References Cited

U.S. PATENT DOCUMENTS

| | | | | |
|---|---|---|---|---|
| 2,362,861 A | * | 11/1944 | Russell | 100/20 |
| 2,524,233 A | * | 10/1950 | Russell | 56/364 |
| 2,571,489 A | * | 10/1951 | Russell | 100/139 |
| 2,647,355 A | * | 8/1953 | Luke | 56/343 |
| 2,691,266 A | * | 10/1954 | Meyer et al. | 56/364 |
| 2,872,772 A | * | 2/1959 | Nolt | 56/364 |
| 3,815,344 A | * | 6/1974 | Kucera | 56/341 |
| 3,815,346 A | * | 6/1974 | Nelson | 56/364 |
| 3,924,391 A | | 12/1975 | Cheatum | |

(Continued)

FOREIGN PATENT DOCUMENTS

EP 1 327 384 A1 7/2003
EP 1 733 609 A1 12/2006

(Continued)

OTHER PUBLICATIONS

U.S. Appl. No. 14/107,385, filed Dec. 16, 2013, Gantzer.

(Continued)

*Primary Examiner* — Árpáp Fábián-Kovács
(74) *Attorney, Agent, or Firm* — Oblon, McClelland, Maier & Neustadt, L.L.P (57) ABSTRACT

An agricultural machine includes a pick-up device with teeth and points, and a guiding device with a lower front end, a rear part and an intermediate part situated above the pick-up device and movable relative to the latter about a rotation center, via a displacement device movable in a first, respectively a second position and including first and second connecting devices which enable the guiding device to pivot about a first, respectively a second rotation center. The first and second connecting devices are geometrically and/or elastically configured so that in the first position, the lower front end is greatly raised above the ground and the intermediate part is brought close to the points, and that in the second position the lower front end is brought greatly close to the ground and the intermediate part and the rear part are distanced from the points.

26 Claims, 8 Drawing Sheets

(56) References Cited

U.S. PATENT DOCUMENTS

| | | | |
|---|---|---|---|
| 4,255,923 A * | 3/1981 | Spaida et al. | 56/364 |
| 4,304,090 A * | 12/1981 | Gavrilenko et al. | 56/364 |
| 4,411,127 A * | 10/1983 | Diederich, Jr. et al. | 56/364 |
| 4,495,756 A * | 1/1985 | Greiner et al. | 56/364 |
| 4,516,389 A * | 5/1985 | Core | 56/341 |
| 4,565,057 A * | 1/1986 | Vissers et al. | 56/364 |
| 4,981,013 A * | 1/1991 | Underwood | 56/104 |
| 6,295,797 B1 * | 10/2001 | Naaktgeboren et al. | 56/364 |
| 6,688,092 B2 * | 2/2004 | Anstey et al. | 56/220 |
| 6,877,304 B1 * | 4/2005 | Smith et al. | 56/364 |
| 6,935,094 B1 * | 8/2005 | McClure | 56/190 |
| 6,962,041 B1 * | 11/2005 | Taylor et al. | 56/364 |
| 7,107,748 B2 * | 9/2006 | McClure | 56/190 |
| 7,448,196 B2 * | 11/2008 | Schrag et al. | 56/341 |
| 7,654,069 B1 * | 2/2010 | Dunham et al. | 56/190 |
| 7,823,371 B2 * | 11/2010 | Gantzer et al. | 56/190 |
| 8,051,634 B2 * | 11/2011 | Mcilwain et al. | 56/190 |
| 2003/0131575 A1 | 7/2003 | Anstey et al. | |
| 2003/0182921 A1 * | 10/2003 | McClure | 56/341 |
| 2006/0277888 A1 | 12/2006 | Erdmann et al. | |
| 2006/0277889 A1 * | 12/2006 | Sheedy et al. | 56/364 |
| 2009/0100814 A1 * | 4/2009 | Egging et al. | 56/1 |
| 2009/0282800 A1 | 11/2009 | Gantzer | |

FOREIGN PATENT DOCUMENTS

| | | |
|---|---|---|
| FR | 2 898 243 A1 | 9/2007 |
| WO | WO 2008/000993 A1 | 1/2008 |

OTHER PUBLICATIONS

U.S. Appl. No. 14/232,447, filed Jan. 13, 2014, Gantzer, et al.
U.S. Appl. No. 14/232,484, filed Jan. 13, 2014, Gantzer, et al.
French Preliminary Search Report issued May 8, 2013 in French Application 12 62381, filed on Dec. 20, 2012 ( with English Translation of Categories of Cited Documents and Written Opinion).

* cited by examiner

AGRICULTURAL HARVESTING MACHINE COMPRISING AN IMPROVED DEVICE FOR GUIDING PLANTS

BACKGROUND OF THE INVENTION

1. Field of the Invention

The present invention relates to an agricultural machine for the harvesting of fodder comprising a frame to which is connected a structure situated, at least partially, above at least one pick-up device for picking up plants lying on the ground, the pick-up device comprising teeth with teeth points describing a curve envelope when the teeth are driven, the machine also comprising at least one processing device for processing the picked up plants which is situated close to the pick-up device, and a guiding device for guiding the plants which is situated at least partially above and at a small distance from the pick-up device, the guiding device being displaceable with respect to the pick-up device about a main instantaneous rotation center, by means of a displacement device comprising a first connecting means and a second connecting means of the guiding device to the structure, the first connecting means enabling the guiding device to pivot about a first instantaneous rotation center, the second connecting means enabling the guiding device to pivot about a second instantaneous rotation center, the displacement device being able to be placed in at least a first position and a second position, the guiding device comprising a front part having a lower front end, a rear part delimited by a rear end, and an intermediate part connecting the front part to the rear part.

2. Discussion of the Background

On a known machine of this type, the pick-up device comprises a rotor with teeth of the "pick-up" type. The rotor is partially surrounded by a guiding surface formed for example by a set of curved blades, between which the teeth carried by the rotor rotate, and with respect to which curved blades the teeth points emerge. When the rotor rotates, the teeth pick up the plants at the level of the ground, lift them and project them towards the rear along the guiding surface. In the first position provided on this machine, the lower front end of the guiding device is raised greatly above the ground to allow the passage of a large-volume windrow towards the pick-up device. In this first position, the intermediate part of the guiding device extends substantially to the horizontal above the pick-up device and substantially at the same height as the lower front end, hence the intermediate part is situated at a great distance from the teeth points of the pick-up device. The result of this is that in this first position, the intermediate part of the guiding device cannot properly keep the plants in contact with the teeth which are situated at the front and on the top of the pick-up device. Consequently, the plants are carried along in an irregular manner towards the processing device located downstream. In addition, a harmful accumulation of plants can occur between the pick-up device and the processing device, or within the latter. The known machine also comprises a second position provided in particular for the picking up of windrows which are light or small in volume. In this position, the lower front end of the guiding device is brought closer to the ground than in the first position. It nevertheless remains at too great a height from the ground to prevent the projections of plants towards the front when the toothed rotor rotates, these projections existing due to the lightness of the picked up plants. These projections fall down in a random manner on the windrow which has not yet been picked up, situated at the front of the machine, and make it irregular. Consequently, the supplying with plants of the pick-up device and of the processing device downstream is irregular, for example in the form of bundles of variable volume. This drawback also exists when the machine is picking up plants which are spread out on the ground in short strands. In the second position of the known machine, the intermediate part and the rear part are very close to the pick-up device to the extent that they are situated lower than the teeth points and nearly touch the guiding surface. Consequently, the flow of light plants is braked when it passes between the pick-up device and the intermediate and rear parts, which reduces the output per hour of the machine.

SUMMARY OF THE INVENTION

The present invention has the aim of proposing an agricultural machine for the harvesting of fodder which does not have the above-mentioned drawbacks. According to the invention, a great volume of plants which are heavy, with long strands or else in the form of a windrow, can pass beneath the lower front end of the guiding device, downstream of which lower front end these plants are readily taken up by the teeth of the pick-up device. The machine according to the invention also allows plants which have short strands or are light, spread out on the ground over a low height, to be integrally gathered, by preventing a portion of them from finding themselves projected towards the front. These picked up plants are then moved quickly towards the processing device and directed and/or distributed thereon in an optimum manner.

To this end, an important feature of the invention consists in that the first connecting means and the second connecting means are geometrically and/or elastically configured such that in the first position, the lower front end is raised greatly above the ground and the intermediate part is brought close to the teeth points of the pick-up device, and that in the second position the lower front end is brought greatly close to the ground and the intermediate part and the rear part are distanced from the teeth points of the pick-up device.

In the first position, the teeth points cooperate with almost the whole of the plants which pass between the pick-up device and the intermediate part of the guiding device. The risk of seeing plants stopping between the latter and the teeth points is considerably reduced. In addition, the picked up plants supply the processing device in a regular manner. Advantageously, in this first position, the rear end of the guiding device is also brought closer to the teeth points of the pick-up device, the teeth of which penetrate the flow of plants and draw it along over the entire extent of the guiding device situated above the pick-up device.

In the second position, the distancing of the intermediate part and of the rear part with respect to the pick-up device increases the passage section of the plants downstream of the lower front end of the guiding device. Thus, plants which are light or with short strands are speeded up and at their exit from the pick-up device have a high speed so as to be projected to the optimum location on the processing device or so as to be distributed over the entire surface thereof. It is thus prevented that such plants arrive solely at the inlet of the processing device or even accumulate between the latter and the pick-up device. In particular when the processing device moves the picked-up plants transversely to a direction of advance of the machine to form a windrow, the invention enables the latter to present a regular appearance.

BRIEF DESCRIPTION OF THE DRAWINGS

Other features and advantages of the invention will emerge from the following description with reference to the attached drawings which represent several non-restrictive example embodiments of the machine according to the invention.

In these drawings.

DESCRIPTION OF THE PREFERRED EMBODIMENTS

The agricultural machine according to the invention comprises a frame 1 able to be connected to a tractor, not shown, making it possible to move the machine in a direction of advance A. In the following description, the terms "left", "right", "front", "rear", "downstream" and "posterior" are defined with respect to the direction of advance A, and the terms "up", "top" and "low" are defined with respect to the ground. As can be seen from FIG. 1, this frame 1 carries a pick-up device 2 for picking up plants lying on the ground and a processing device 3 placed downstream. The pick-up device 2 comprises a curved guiding surface 4 which surrounds a rotor 5 driven about a rotation axis 6 in anticlockwise direction 7, seen from the right of the pick-up device 2. The latter also comprises teeth 8 which pick-up the plants at the level of the ground, lift them and project them towards the rear. The teeth 8 comprise teeth points 9 which describe a curve envelope 10 when the teeth 8 are driven. The teeth 8 emerge at least partially from the guiding surface 4. The guiding surface 4 comprises an upper end 11 and a lower end 12 situated substantially plumb with the rotation axis 6 of the rotor 5. In the example embodiments of the figures, the pick-up device 2 is of the pick-up type, the teeth 8 of which are carried by the rotor 5 and emerge from the guiding surface 4 formed by a large number of curved blades around the rotor 5 and placed one beside the other along the rotation axis 6. The teeth 8 move between these blades. In these examples of the figures, the guiding surface 4 is fixed. The teeth 8 are controlled such that the curve envelope 10 described by the movement of the teeth points 9 is not cylindrical. In fact, as can be seen for example from FIG. 2, the teeth 8 retract inside of the guiding surface 4 after having passed the upper end 11 thereof. In this way, the teeth 8 progressively release the plants which approach the processing device 3. Such a movement of the teeth 8 is obtained by means, for example, of a fixed cam track, inside of which rollers move which are carried by cams connected to the teeth 8. Alternatively, non-controlled teeth 8 can also be envisaged. In this case, the curve envelope 10 described by the teeth points 9 is a cylinder centered on the rotation axis 6 of the rotor 5. Other embodiments of the pick-up device 2 remain possible. The latter can thus comprise a flexible belt wound around a first rotor placed at the front of the pick-up device 2 and around a second rotor placed more to the rear. This second rotor in particular can be placed, during work, at a higher distance from the ground than the first rotor, such that the pick-up device 2 moves the plants towards the rear and upwards in the direction of the processing device 3. Such a belt comprises teeth, forks or hooks which can be fixed or articulated on the belt. In this embodiment, the guiding surface 4 is constituted by the surface of the belt in contact with the plants. The guiding surface 4 in this case is driven. The rotation axis 6 of the rotor 5 is that of the first rotor. The upper end 11 and the lower end 12 of the guiding surface 4 are situated substantially plumb with the rotation axis 6 of the first rotor, at the level of the upper part or respectively the lower part of the first rotor.

The driving of the pick-up device 2 is carried out by means of any suitable element. It can be a hydraulic or electric motor 13, which motor 13 can be housed inside of the rotor or projects laterally beyond the latter. The pick-up device 2 can also be driven by means of a chain or a belt, or else by a geartrain. A combination of such means is also possible.

The processing device 3 of the picked up plants is situated at the rear and close to the pick-up device 2 such that it receives the plants projected towards the rear by the latter. In the example embodiments of the figures, this processing device 3 comprises a belt conveyor having a belt 14. This belt 14 is driven during work such that it moves the plants transversely to the pick-up device 2. The plants are then redeposited on the ground in the form of a windrow with a view to their being subsequently taken up again. On the rear side of the processing device 3 a deflector 15 is arranged, which comprises a substantially vertical portion to limit the projection of the plants towards the rear. The deflector 15 can also comprise another substantially horizontal portion to limit the projections of plants upwards. In the example embodiments of the figures, this other portion is placed in the continuity of the substantially vertical portion, above the belt conveyor. The processing device 3 can also be a conveyor with rollers, these latter being mounted for example on rotation axes oriented, during work, substantially in the direction of advance A. Such rollers are preferably placed beside one another and at a slight distance from one another, and can be driven such that the plants are moved transversely to the pick-up device 2.

The driving of the processing device 3, for example of the belt conveyor or of the rollers, is carried out by means of any suitable element. It can be a hydraulic or electric motor. A driving by means of a chain or a belt, or else a geartrain, can also be envisaged. A combination of such means is, of course, possible. These means can be actuated in one operating direction or in the other. In particular, in the case of a belt conveyor or a conveyor with rollers, the plants can thus be transferred towards the left side or the right side of the machine, for example to form a windrow on one side or the other.

Figure 1:
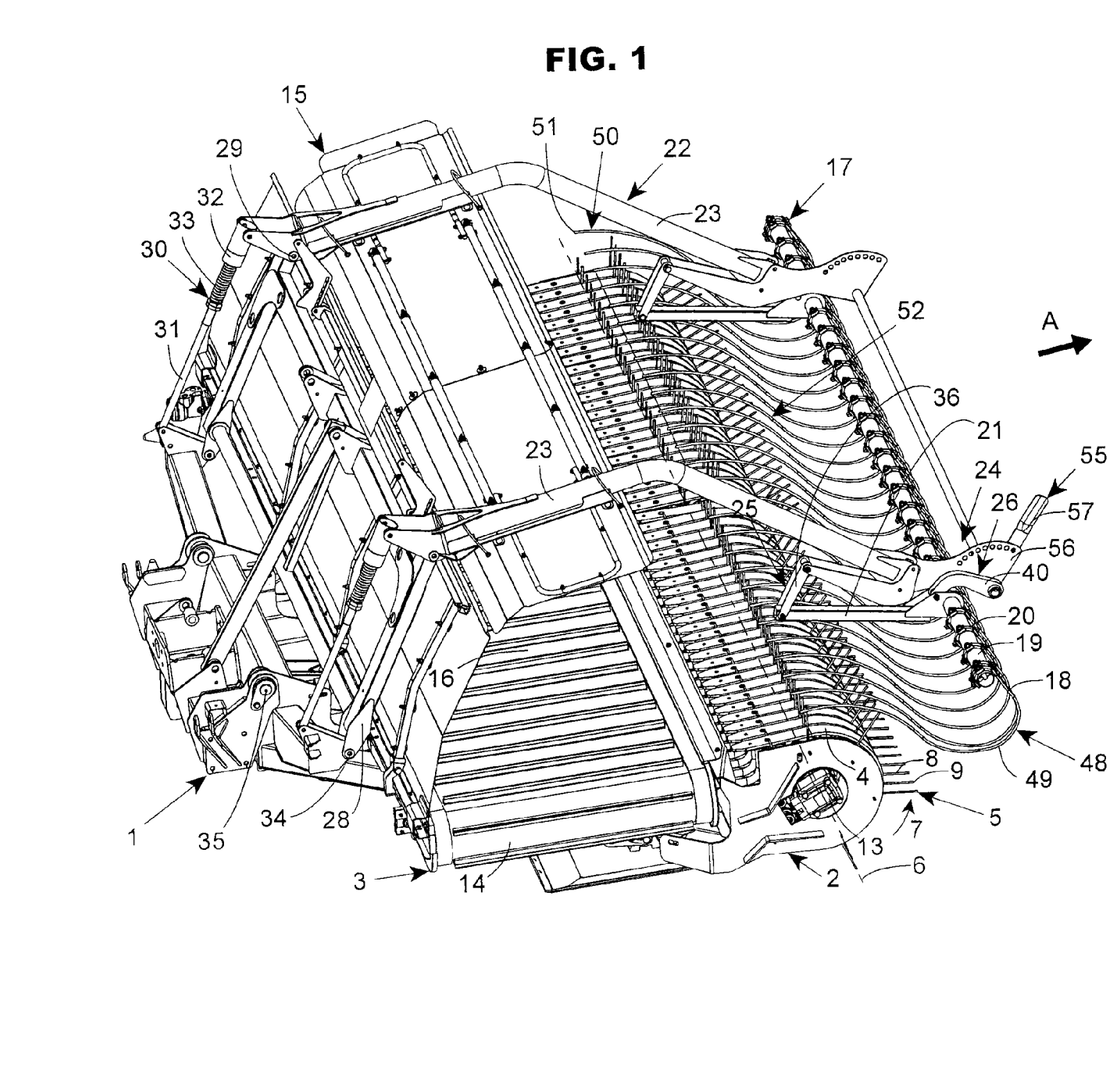
FIG. 1 represents an overall view of an example embodiment of the invention in work configuration.

The processing device 3 comprises an upper envelope 16. In the case of a belt conveyor, this envelope 16 is constituted by the upper surface of the belt 14 which receives the plants moved by the pick-up device 2. In the example embodiments of the figures, this upper surface extends, during work, in a manner substantially parallel to the ground. In FIG. 1, it can be seen that the belt conveyor comprises strips fixed to the belt 14. These strips are oriented substantially perpendicularly to the direction of advance of the belt 14. These strips emerge from the upper surface of the belt 14. In the case of a conveyor with rollers, the upper envelope 16 is a substantially plane imaginary surface which rests on the top of the rollers.

The machine can comprise several pick-up devices 2 and processing devices 3 placed side by side, with a view to increasing its working width.

A guiding device 17 for the plants is situated at least partially above and at a small distance from the pick-up device 2.

In the example embodiments of the figures, the guiding device 17 comprises flexible rods 18 which are substantially parallel with one another and which extend from the front of the pick-up device 2 towards the rear. During the picking up by the teeth 8, the plants come in contact with the rods 18 and slide along the latter towards the rear. These rods 18, in addition, keep the plants in engagement with the teeth 8, at least over a portion of the height of the teeth 8. The rods 18 of the guiding device 17 are fixed on a bar 19. They each comprise a spring part 20 formed for example by a winding in the form of a coil of the metal wire which composes the rod 18. In the example embodiments of the figures, each spring part 2 is threaded on the bar 19 and held by a bolt. As can be seen from FIG. 1, the bar 19 is connected to two strips 21 which extend towards the rear from the bar 19. Each strip 21 is situated beneath a structure 22 carrying the guiding device 17. This structure 22 is connected to the frame 1 which carries it, and it is situated at least partially above the pick-up device 2. This structure 22 comprises arms 23 which carry the guiding device 17 and extend towards the rear over the processing device 3. Each strip 21 of the guiding device 17 is carried in a mobile manner by the corresponding arm 23 by means of a displacement device 24 comprising two connecting means 25 and 26. The guiding device 17 is thus displaceable with respect to the pick-up device 2 by means of the displacement device 24 carried by the arm 23, about a main instantaneous rotation center 27. During the displacements of the guiding device 17, the main instantaneous rotation center 27 moves according to a particular law dictated by the arrangement of the displacement device 24, which arrangement is the subject of a detailed description later in the text.

The arms 23 are connected close to their rear ends to supports 28 connected to the frame 1. These arms 23 are thus distanced from the pick-up device 2 and the processing device 3 so as not to impede the movements of the plants. The arms 23 are articulated with respect to the frame 1 by means of substantially horizontal axes 29. These axes 29 are carried by the supports 28. In a work configuration illustrated in particular in FIG. 1, these axes 29 are positioned above the rear part of the processing device 3. The arms 23 can pivot upwards by a certain angle about these axes 29.

The pivoting angle of the arms 23 about these articulation axes 29 is limited by means of stops 30. Each of these stops 30 is constituted by a rod 31, one of the ends of which is articulated on the frame 1 and the other end of which is engaged in a sleeve 32 which is articulated on the end of one of the arms 23. The end which is engaged in the sleeve 32 is provided with a shoulder situated between two stops placed at the two ends of the sleeve 32. The stops limit the possible displacement of the sleeve 32 with respect to the shoulder of the rod 31 and consequently the pivoting angle of the arms 23 about the articulation axes 29. A compression spring 33 is arranged between the rod 31 and the sleeve 32 of each stop 30. This spring exerts a pressure on the corresponding sleeve 32 which tends to cause the arms 23 and the guiding device 17 to pivot in the direction of the pick-up device 2 so as to keep the guiding device 17 in contact with the moved plants. In addition, this spring 33 damps the movements of the arms 23 about the articulation axes 29.

The supports 28 of the arms 23 are connected to the frame 1 by means of substantially horizontal articulation axes 34 situated at the rear of the processing device 3 and around which they can be moved. These supports 28 thus form deformable parallelograms with the stops 30, the ends of the arms 23 and parts of the frame 1. These parallelograms make it possible to move and held the arms 23 and the guiding device 17 in the work configuration and in a transport configuration, in particular. To this end, between the frame 1 and the supports 28 the machine can comprise jacks, for example hydraulic jacks, not shown, allowing these supports to be moved around the axes 34. These jacks can be controlled from the tractor so that they carry out the said movements.

This arrangement thus makes it possible to transpose the machine into the configuration for transport on the road, in which its dimensions are reduced. In this configuration, by pivoting of the supports 28 around the axes 34 in clockwise direction, viewed from the right, the arms 23 are brought into a position very close to the processing device 3, the guiding device 17 being then situated substantially in the extension of the pick-up device 2 and these three devices 2, and 17 being in addition together brought close to the vertical by pivoting about a substantially horizontal axis 35 of the frame 1. This movement towards the vertical is carried out by means of a jack, for example a hydraulic jack, placed beneath the processing device 3 and resting on the frame 1. Thus placed at the vertical, these devices 2, 3 and 17 can then be folded together towards the rear or towards the front with a part of the frame 1 about a substantially vertical axis, so as to be oriented in the direction of advance A.

The displacement device 24 comprises a first connecting means 25 and a second connecting means 26 for connecting the guiding device 17 to the structure 22. In the example embodiment of FIGS. 1 to 6, the first connecting means 25 comprises a first connecting rod 36 connected to the structure 22 by a first articulation 27 and to the guiding device 17 by a second articulation 38. The first connecting means 25 enables the guiding device 17 to pivot about a first instantaneous rotation center 39. The latter is real as it is constituted, in this example, by a center of the first articulation 37. Still in the example of FIGS. 1 to 6, the second connecting means 26 comprises a second connecting rod 40 connected to the structure 22 by a third articulation 41 and to the guiding device 17 by a fourth articulation 42. The second connecting means 26 enables the guiding device 17 to pivot about a second instantaneous rotation center 43. The latter, also real, is constituted in this example by a center of the third articulation 41. These different articulations 37, 38, 41 and 42 are constituted for example by axes extending, during work, substantially perpendicularly to the direction of advance A of the machine. In the example embodiment of FIGS. 1 to 6, a first straight line D1 passing through the first and second articulations 37 and 38, crosses a second straight line D2 passing through the third and fourth articulations 41 and 42 at a point constituting the main instantaneous rotation center 27 about which the guiding device 17 can pivot.

Figure 7:
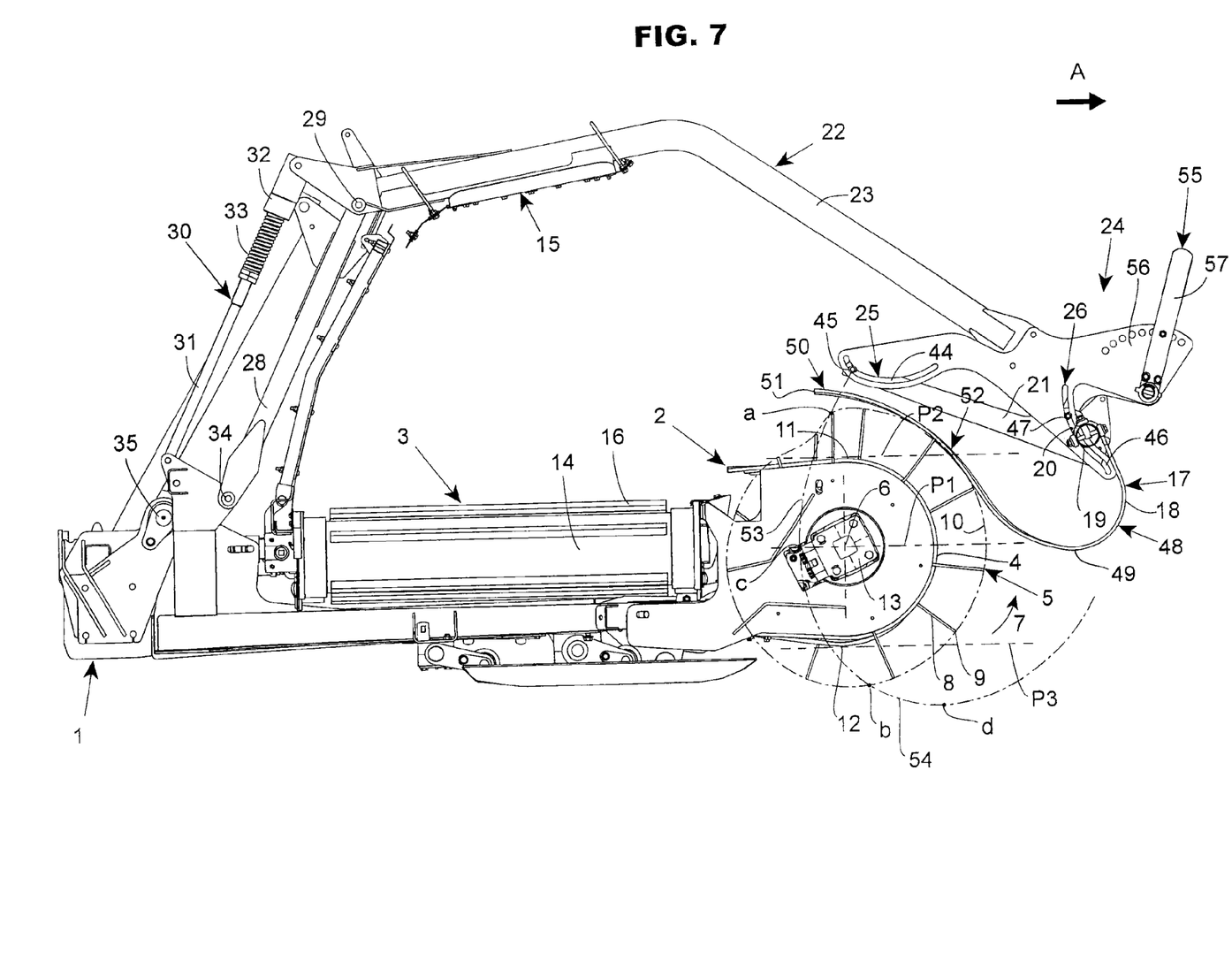
FIG. 7 represents a lateral view of another example embodiment of the invention.

According to another example embodiment of the invention illustrated by FIG. 7, the first connecting means 25 comprises a first guide track 44 connected to the structure 22. Inside this first track 44 a first axis 45 connected to the guiding device 17 can move about the first instantaneous rotation center 39. In this example, the arm 23 carries a lateral plate in which an aperture is cut-out forming the first guide track 44. Inside this aperture, the first axis 45 is inserted, and the latter can slide in the aperture. Alternatively, the first guide track 44 can be formed by a relief track, similar to a cam track, inside of which a roller pivotably mounted about the first axis 45 can roll. The first instantaneous rotation center 39 has a position which is dictated by the geometry of the first guide track 44. This first instantaneous rotation center 39 is virtual. In the example of FIG. 7, the first guide track 44 has any curved shape, therefore the virtual first instantaneous rotation center 39 moves during the movements of the displacement device 24. However, the shape of the first guide track 44 can follow a circular arc. In this case, the virtual first instantaneous rotation center 39 is fixed and coincident with the geometric center of the circular arc. In the example of FIG. 7, the second connecting means 26 comprises a second guide path 46 connected to the structure 22, inside of which second guide track 44 a second axis 47, connected to the guiding device 17, can move about the second instantaneous rotation center 43. The different embodiments of the second guide track 46 follow those of the first guide track 44. Likewise, the second instantaneous rotation center 43, which is virtual in this example, can be fixed or mobile. A combination of a first guide track 44 of circular shape with a second guide track 46 of curved, non-circular shape, is entirely possible.

According to other embodiment possibilities, not shown, one of the first and second connecting means 25 and 26 can comprise a connecting rod articulated between the guiding device 17 and the structure 22, whilst the other comprises a guide track with a displaceable axis as previously described.

The first and second connecting means 25 and 26 can further follow other embodiment examples, not shown. Thus, at least one of the connecting means 25 and 26 can be an element of elongated shape, such as a bar or a lever, the geometry and/or the material of which element are configured so that the connecting means 25, 26 can deform elastically according to a defined law, such that the guiding device 17 moves with respect to the pick-up device 2 according to the kinematics suitable for the invention. For example, the connecting means 25, 26 can be a metal sheet of small thickness, fixed to the guiding device 17 and to the structure 22, and able to bend in a plane parallel to the direction of advance A. The connecting means 25, 26 can also be a bar of elastomer material, for example of rubber, the geometry of which—length, cross-section, presence of ribs in particular—and/or the properties of the material allow the bar to deform in a controlled manner.

As can be seen from the figures, the guiding device 17 comprises a front part 48 having a shape curved in the direction of the ground. This front part 48 is placed at the front of the pick-up device 2 such that the front part 48 passes above the plants present on the ground before the latter are engaged with the pick-up device 2 to be picked-up by the latter. This front part 48 comprises a lower front end 49. In the example embodiments of the figures, this lower front end 49 is constituted by the crown, oriented towards the ground, of the curved shape of the front part 48 of the flexible rods 18. The guiding device 17 also comprises a rear part 50 delimited by a rear end 51, constituted in the example of the figures by the back end of the flexible rods forming the guiding device 17. An intermediate part 52 connects the front part 38 to the rear part 50. The intermediate part 52 is substantially parallel to the curve envelope 10 described by the teeth points 9.

Apart from a large number of juxtaposed flexible rods 18, the guiding device 17 can be formed by a curved sheet extending from the front of the pick-up device 2 towards the rear. A combination of flexible rods 18 and of one or several sheets can be envisaged. The guiding device 17 can also comprise at least one front roller pivotably mounted about an axis extending, during work, perpendicularly to the direction of advance A. This roller can turn about the axis in a free manner or driven by means of an actuator, such as a motor. The front part 48 of the guiding device 17 is then constituted by the roller, the lower part of which delimits the curved shape of the front part 48. Extending at the rear of the roller are, for example, flexible rods, a sheet, or a combination of these elements, so as to constitute the intermediate part 52 and the rear part 50 of the guiding device 17.

The displacement device 24 can be placed in at least a first position and a second position. According to the invention, the first connecting means 25 and the second connecting means 26 are geometrically and/or elastically configured such that in the first position illustrated in FIG. 2, the lower front end 49 of the guiding device 17 is raised greatly above the ground and the intermediate part 52 is brought close to the teeth points 9 of the pick-up device 2, and that in the second position represented in FIG. 6, the lower front end 49 is brought greatly close to the ground and the intermediate part 52 and the rear part 50 are distanced from the teeth points 9 of the pick-up device 2. "Geometrically" is understood to mean that the connecting means 25 and 26 are, in particular in terms of dimensions, shape and positioning of the articulations to the guiding device 17 and to the structure 22, configured to obtain the first and second positions as previously described. "Elastically" is understood to mean that the connecting means 25 and 26 have a capacity to deform in an elastic manner as a function of their dimensional features and the intrinsic qualities of the material(s) which compos(es) them.

Advantageously, in the first position, the rear end 51 of the guiding device 17 is also brought close to the teeth points 9 of the pick-up device 2. Thus, the teeth 8 penetrate the flow of plants and draw it along over the entire extent of the guiding device 17 situated above the pick-up device 2.

In the first position, the main instantaneous rotation center 27 is located in the vicinity of the rear end 51 of the guiding device 17. In this way, when the guiding device 17 is moved in the vicinity of the first position, it pivots substantially about its rear end 51 so as to adjust the orientation of the rear part 50 with respect to the processing device 3. This can be seen from a comparison of FIG. 2, showing the first position, with FIG. 3, representing a position close to the first position.

In the first position, the rear part 50 of the guiding device 17 extends preferably substantially parallel to the upper envelope 16 of the processing device 3, i.e. in the example embodiments of the figures, substantially parallel to the upper surface of the belt 14 which composes it. By contrast, FIG. 3 shows that, when the guiding device 17 moves away a little from the first position (FIG. 2), its rear part 50 inclines with respect to the belt 14. Thus, by the adjustment of the guiding device 17 in the close vicinity of the first position, the user can determine with precision the manner in which the plants are projected in the direction of the processing device 3, as a function for example of a variable proportion of short strands in the picked up windrow.

Figure 2:
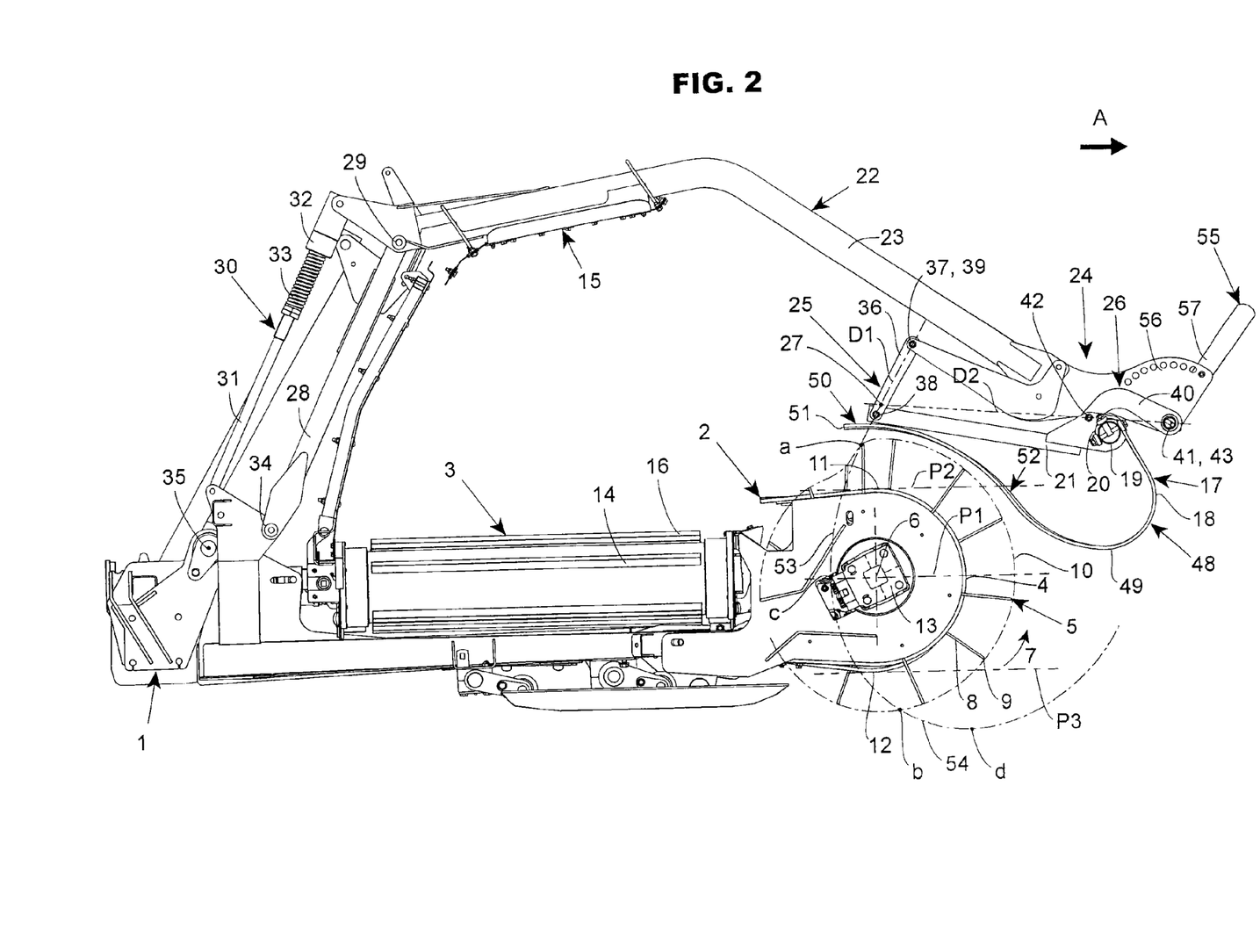
FIG. 2 represents a lateral view of the example embodiment in the first position.
Figure 3:
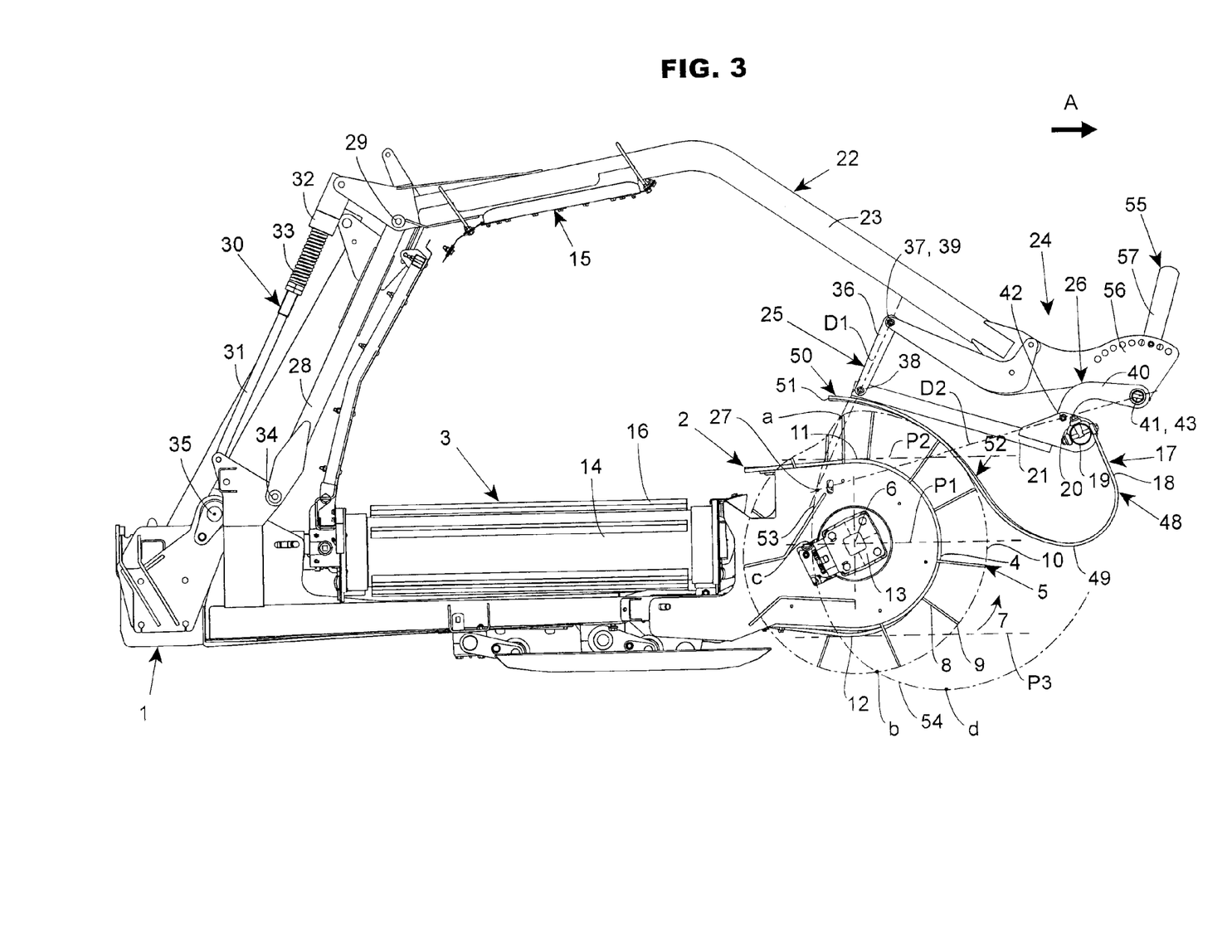
FIG. 3 represents a lateral view of the example embodiment in a position close to the first position.

In addition, it can be seen from FIG. 2 that in the first position, the rear end 51 of the guiding device 17 is situated, relative to the direction of advance A, backwards of the upper end 11 of the guiding surface 4. This feature allows the plants moved in the direction of the processing device 3 to be guided beyond the upper end 11, whilst they are simultaneously and progressively released by the teeth 8 which retract backwards of the upper end 11.

Figure 4:
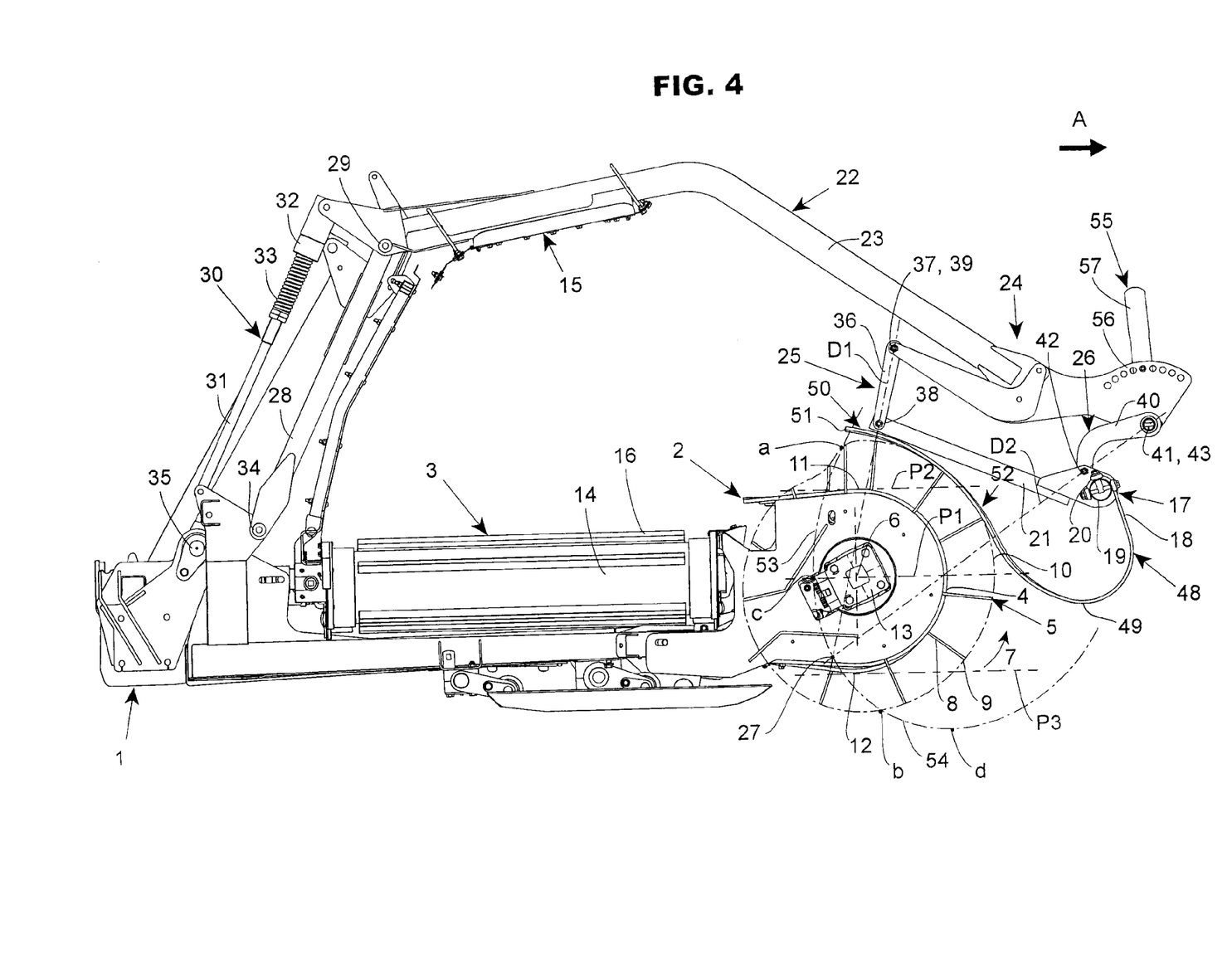
FIG. 4 represents a lateral view of the example embodiment in a position situated between the first position and the second position.
Figure 5:
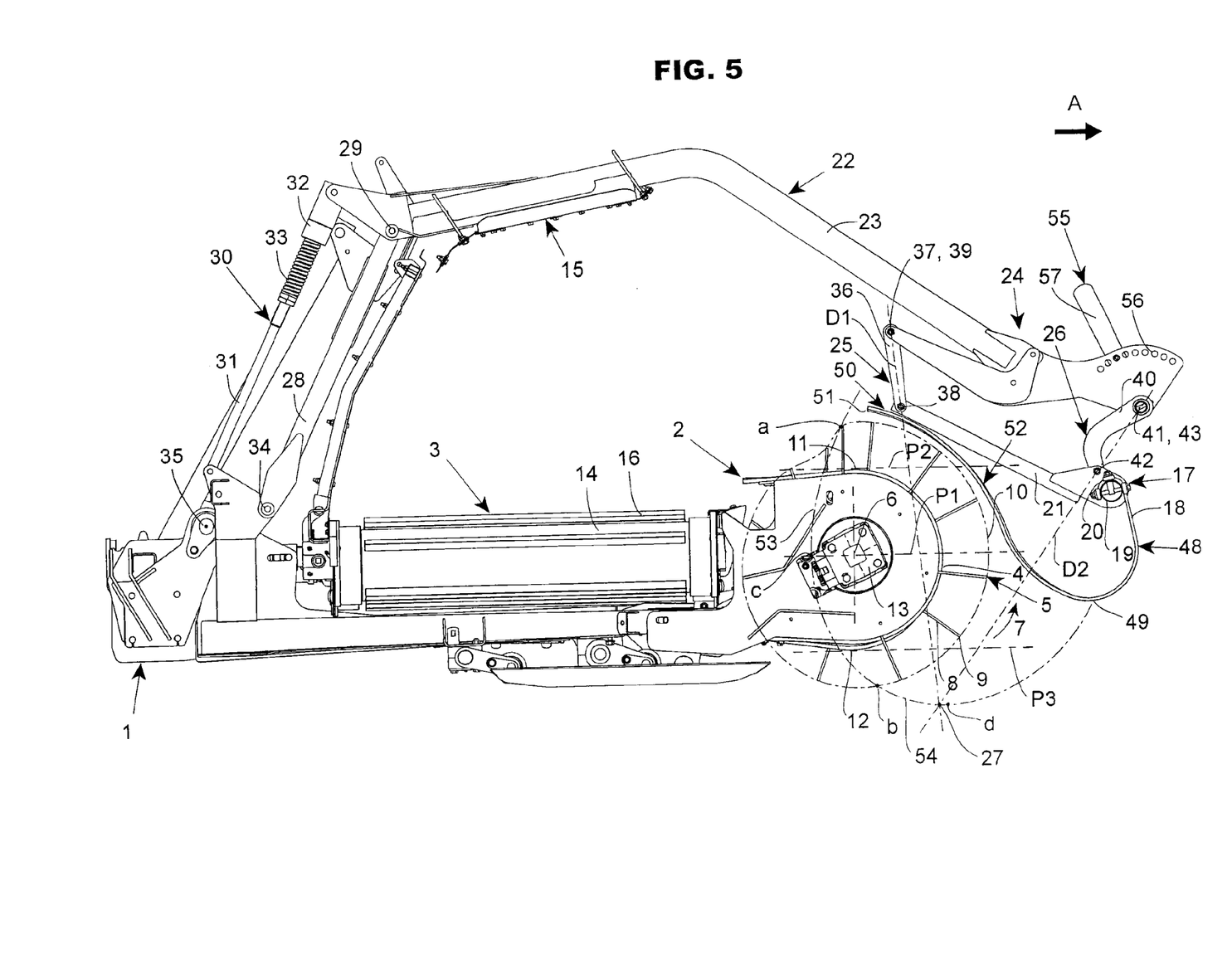
FIG. 5 represents a lateral view of the example embodiment in a position close to the second position.

When the displacement device 24 is moved between the first position and the second position, the main instantaneous rotation center 27 moves along a first curve portion 53 situated inside of the curve envelope 10 described by the teeth points 9. It can be seen in fact that in the intermediate positions of the guiding device 17 illustrated in FIGS. 3 and 4, the main instantaneous rotation center 27 is situated on this first curve portion 53 delimited by the points of intersection a and b with the curve envelope 10. In this way, when the main instantaneous rotation center 27 moves along the first curve portion 53, the intermediate part 52 of the guiding device 17 moves along the curve envelope 10 and is substantially tangent to the latter. The passage section of the plants between the guiding device 17 and the guiding surface 4 therefore remains substantially constant, and the plants remain well in engagement with the teeth 8. The plants are therefore conveyed in a regular manner towards the processing device 3, without the risk of the formation of bundles or jams. The adjustment of the guiding device 17 in the positions of FIGS. 3 and 4 is particularly suited to conditions of fodder of average density or comprising a certain mixture of short strands and long strands. In fact, during the displacement of the main instantaneous rotation center 27 along the first curve portion 53, the rear part 50 of the guiding device 17 sees its inclination vary with respect to the upper envelope 16 of the processing device 3. This allows projecting the plants at the optimum site on the processing device 3. At the same time, the front part 48 extends at a greater or lesser height from the ground. The user thus has the possibility of reducing to a greater or lesser extent the tendency of the plants to be projected forwards of the pick-up device 2.

Figure 6:
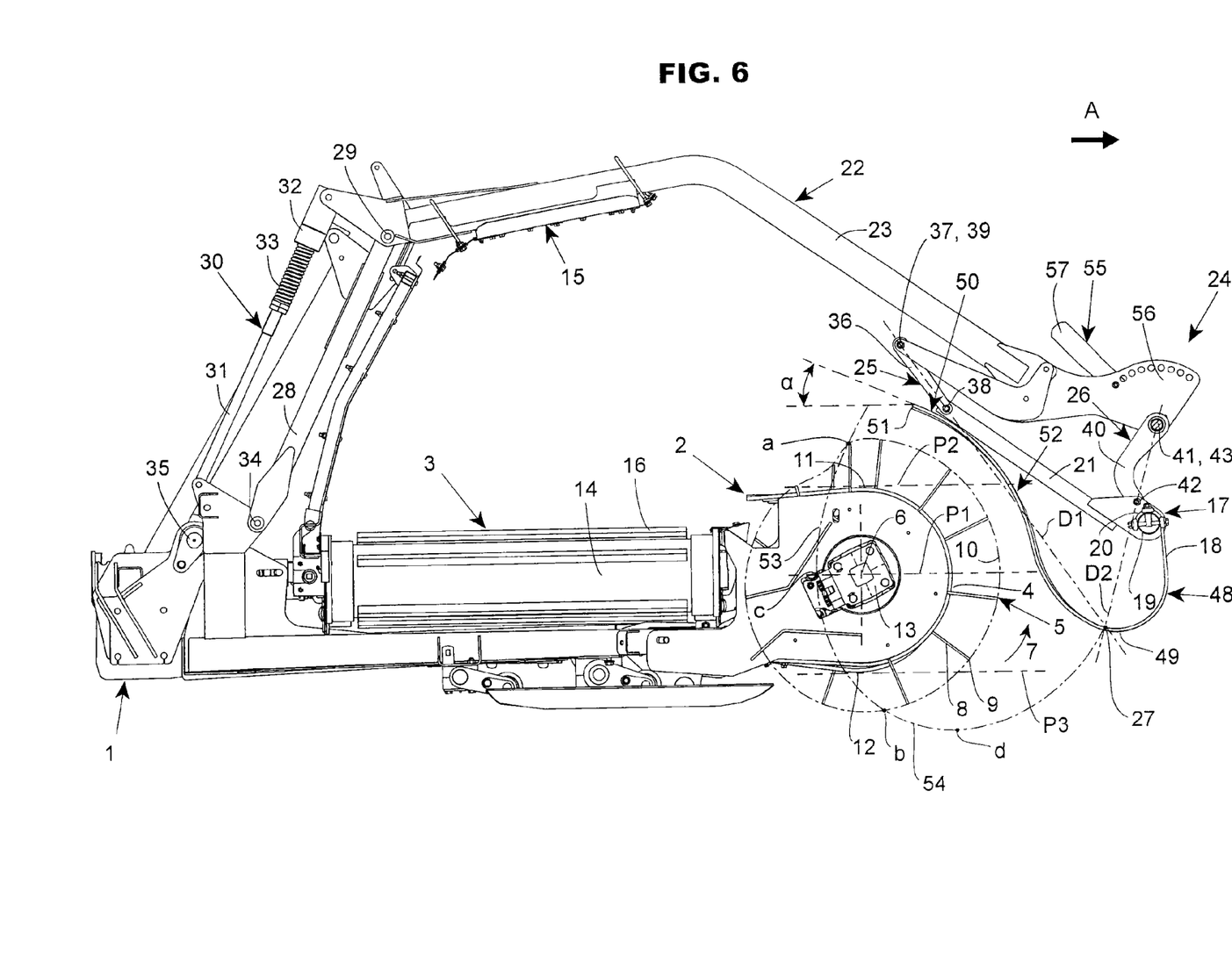
FIG. 6 represents a lateral view of the example embodiment in the second position.

In the second position represented in FIG. 6, the main instantaneous rotation center 27 is located in the vicinity of the lower front end 49 of the guiding device 17. In this way, the displacement of the guiding device 17 from the first to the second position ends by an essentially pivoting movement about the lower front end 49, the height of which with respect to the ground has reached a minimum. By this pivoting, the intermediate part 52 and the rear part 50 are distanced from the teeth points 9 of the pick-up device 2. In this way, in the second position, the intermediate part 52 is preferably distanced from the teeth points 9 by approximately twice the distance separating the teeth points 9 from the guiding surface 4. The passage section of the plants downstream of the lower front end 49 is therefore large, which enables plants which are light or have short strands to acquire a high speed at their exit from the pick-up device 2.

Preferably, in the second position, the rear part 50 of the guiding device 17 forms an angle α comprised between 10° and 45° with the upper envelope 16 of the processing device 3. The plants, projected at high speed and in an oblique manner with respect to the processing device 3, thus fall again on the latter at the optimum location.

It is, in addition, advantageous that in this second position, the rear end 51 of the guiding device 17 is situated, relative to the direction of advance A, forwards of the upper end 11 of the guiding surface 4. In this way, the plants are not braked or driven towards the processing device 3 when they start to be released by the teeth 8 rearwards of the upper end 11.

When the displacement device 24 is moved between the first position and the second position, the main instantaneous rotation center 27 moves along a second curve portion 54 inclined towards the ground following the direction of advance A of the machine. In the intermediate positions of the guiding device 17 represented in FIGS. 4 and 5, the main instantaneous rotation center 27 is situated on this second curve portion 54 delimited by the points c and d. The comparison of these figures allows it to be noted that during the displacement from the position of FIG. 4 towards that of FIG. 5, the intermediate part 52 of the guiding device 17 begins to move away from the teeth points 9, whilst the lower front end 49 is situated at a distance from the ground close to the minimum reached in the second position. In this way, a harmonious transition is obtained between the movement of the guiding device 17 along the teeth points 9 and the final pivoting movement about the lower front end 49.

As can be seen from FIG. 4, the first curve portion 53 and the second curve portion 54 are preferably at least partially coincident. In fact, the point c is situated higher than the point b.

The displacement device 24 is configured such that in the first position the lower front end 49 of the guiding device 17 is situated at a great height from the ground, for example to pass above a windrow which has a large volume. Such a clearance is advantageously obtained by the fact that, in this first position, the lower front end 49 of the guiding device 17 is situated between a first horizontal plane P1 passing through the rotation axis 6 of the rotor 5, and a second horizontal plane P2 passing through the upper end 11 of the guiding surface 4.

In the second position, the lower front end 49 is brought close to the ground to a great extent. To this end, the latter is situated, in this second position, between the first horizontal plane P1 passing through the rotation axis 6 of the rotor 5 and a third horizontal plane P3 passing through the lower end 12 of the guiding surface 4.

Figure 8:
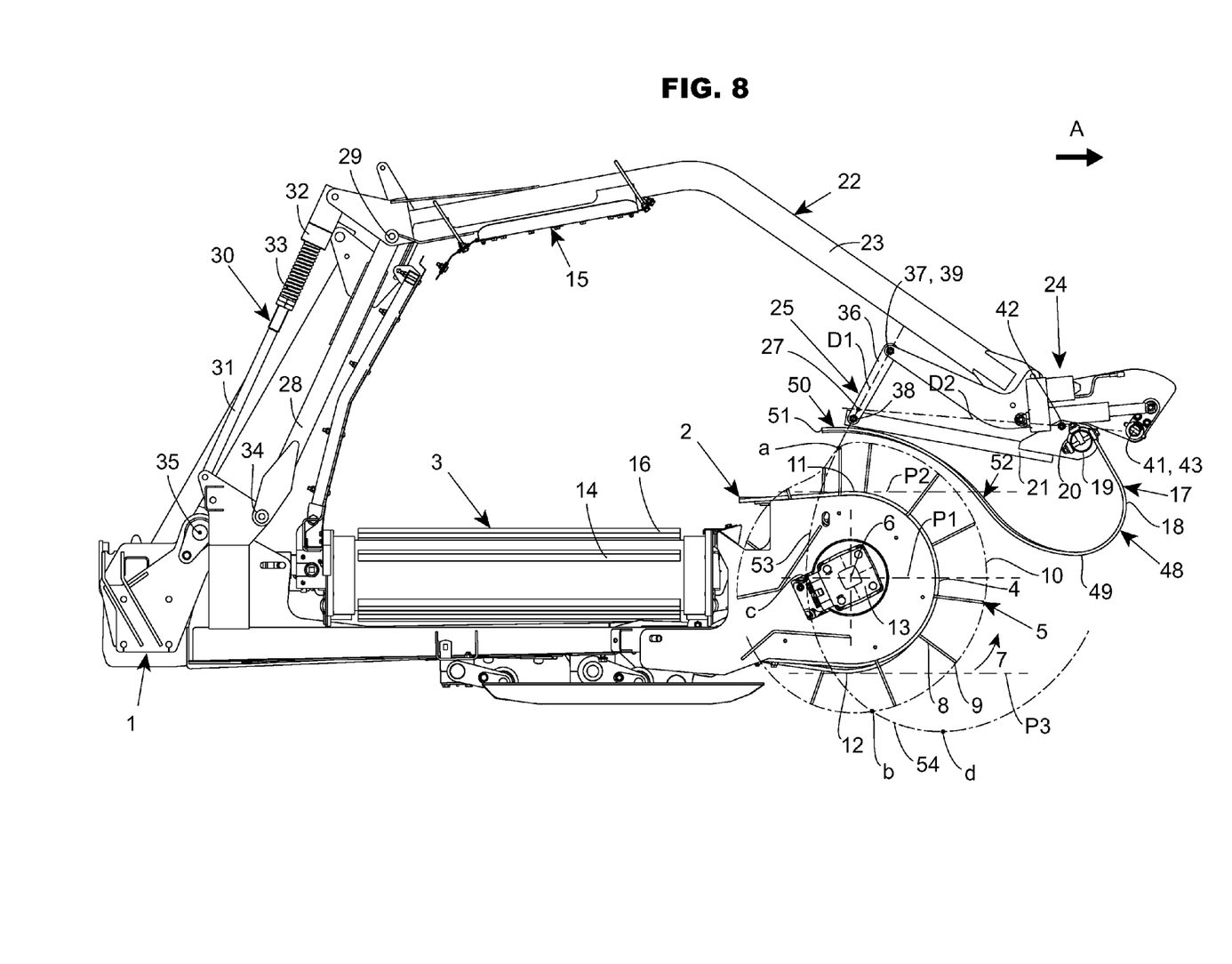
FIG. 8 represents a lateral view of another example embodiment of the invention.

The displacement device 24 can be kept in the first and second positions by means of an adjustment device 55 with direct or remote control. In the figures, the adjustment device 55 is a direct control device. One of the arms 23 carries a sector 56 comprising notches or holes. In the example embodiment of FIGS. 1 to 6, this sector 56 supports the connecting rod 40 situated at the front of the guiding device 17. This connecting rod 40 is integral with a control lever 57 which the user can position in one of the notches or holes provided on the sector 56, in order to place the guiding device 17 in the different positions. In addition, the presence of several notches or holes means that the displacement device 24 can be kept, by means of the adjustment device 55, in at least one intermediate position comprised between the first and second positions. These are in particular the positions illustrated by FIGS. 3 to 5. In the example embodiment of FIG. 7, the control lever 57 is connected to the strip 21 of the guiding device 17 by means of a reverse lever which transforms a pivoting of the control lever 57 into a displacement of the first and second axes 45 and 47 within their respective first and second guide tracks 44 and 46. A remote control can be substituted to a direct control such as that which has just been described, as illustrated in FIG. 8. This comprises for example a jack, in particular a hydraulic, electric or pneumatic jack, articulated between the arm 23 and the displacement device 24 or the guiding device 17. This jack can be actuated from a control unit placed permanently on the machine, for example on a part of the frame 1, or remotely positioned in the cab of the tractor to which the machine is hitched. Alternatively, the direct control can comprise a motor, in particular a hydraulic or electric motor. For example, the stator of such a motor is fixed on the arm 23, whilst its rotor is connected to an articulation axis of one of the connecting rods 36 and 40 to the structure 22. A remote control such as those cited by way of example, easily allows the displacement device 24 to be moved and kept in the first and second positions as well as in any intermediate position. Of course, other forms of adjustment device 55 with direct control or remote control remain able to be envisaged. The manner in which such a device 55 is connected to the structure 22 on one hand, and to the displacement device 24 or to the guiding device 17 on another hand, is able to be adapted as a function for example of the manner in which the first and second connecting means 25 and 26 are configured.

It is readily evident that the invention is not limited to the example embodiments described and represented in the attached figures. Modifications remain possible, in particular with regard to the constitution or the number of the various elements or by substitution of technical equivalents without, however, departing from the scope of protection.

What is claimed as new and desired to be secured by Letters Patent of the United States is:

1. An agricultural machine for the harvesting of fodder comprising:

a frame to which is connected a structure situated, at least partially, above at least one pick-up device for picking up plants lying on the ground, the pick-up device comprising teeth with teeth points describing a curve envelope when the teeth are drive;

at least one processing device for processing the picked up plants which is situated close to the pick-up device; and a guiding device for guiding the plants which is situated at least partially above and at a small distance from the pick-up device, the guiding device being displaceable with respect to the pick-up device about a main instantaneous rotation center, by means of a displacement device comprising a first connecting means and a second connecting means connecting the guiding device to the structure, the first connecting means enabling the guiding device to pivot about a first instantaneous rotation center, the second connecting means enabling the guiding device to pivot about a second instantaneous rotation center, the displacement device being able to be placed in at least a first position and a second position, the guiding device comprising a front part having a lower front end, a rear part delimited by a rear end, and an intermediate part connecting the front part to the rear part, wherein the first connecting means and the second connecting means are geometrically configured such that in the first position, the lower front end is raised greatly above the ground and the intermediate part is brought close to the teeth points of the pick-up device, and wherein in the second position the lower front end is brought greatly close to the ground and the intermediate part and the rear part are distanced from the teeth points of the pick-up device.

2. The agricultural machine according to claim 1, wherein in the first position, the rear end of the guiding device is brought close to the teeth points of the pick-up device.

3. The agricultural machine according to claim 1, wherein the main instantaneous rotation center is located in the vicinity of the rear end of the guiding device in the first position.

4. The agricultural machine according to claim 1, wherein the main instantaneous rotation center is located in the vicinity of the lower front end of the guiding device in the second position.

5. The agricultural machine according to claim 1, wherein when the displacement device is moved between the first position and the second position, the main instantaneous rotation center moves along a first curve portion situated inside of the curve envelope described by the teeth points.

6. The agricultural machine according to claim 1, wherein when the displacement device is moved between the first position and the second position, the main instantaneous rotation center moves along a second curve portion inclined towards the ground following a direction of advance of the machine.

7. The agricultural machine according to claim 5, wherein the first curve portion and the second curve portion are at least partially coincident.

8. The agricultural machine according to claim 5, wherein when the main instantaneous rotation center moves along the first curve portion, the intermediate part of the guiding device is substantially tangent to the curve envelope described by the teeth points.

9. The agricultural machine according to claim 1, wherein in the first position, the rear part of the guiding device extends substantially parallel to an upper envelope of the processing device.

10. The agricultural machine according to claim 1, wherein the processing device comprises a belt conveyor having a belt or a conveyor with rollers which moves the plants transversely to a direction of advance.

11. The agricultural machine according to claim 9, wherein in the second position, the rear part of the guiding device forms with the upper envelope of the processing device an angle comprised between 10° and 45°.

12. The agricultural machine according to claim 1, wherein the pick-up device comprises a curved guiding surface, fixed or driven, which surrounds a rotor driven about a rotation axis, wherein the teeth of the pick-up device emerge at least partially from the guiding surface, and wherein the guiding surface comprises an upper end and a lower end situated substantially plumb with the rotation axis of the rotor.

13. The agricultural machine according to claim 12, wherein in the first position, the lower front end of the guiding device is situated between a first horizontal plane passing through the rotation axis of the rotor and a second horizontal plane passing through the upper end of the guiding surface.

14. The agricultural machine according to claim 12, wherein in the second position, the lower front end of the guiding device is situated between a first horizontal plane passing through the rotation axis of the rotor and a third horizontal plane passing through the lower end of the guiding surface.

15. The agricultural machine according to claim 12, wherein in the second position, the intermediate part of the guiding device is distanced from the teeth points by approximately twice a distance separating the teeth points from the guiding surface.

16. The agricultural machine according to claim 12, wherein in the first position, the rear end of the guiding device is situated, relative to a direction of advance, backwards of the upper end of the guiding surface.

17. The agricultural machine according to claim 12, wherein in the second position, the rear end of the guiding device is situated, relative to a direction of advance, forwards of the upper end of the guiding surface.

18. The agricultural machine according to claim 1, wherein the front part of the guiding device has a shape curved in the direction of the ground and is placed at the front of the pick-up device such that the front part passes above the plants lying on the ground before the latter are picked up by the pick-up device.

19. The agricultural machine according to claim 1, wherein the first connecting means comprises a first connecting rod connected to the structure by a first articulation and to the guiding device by a second articulation, and wherein the first instantaneous rotation center is constituted by a center of the first articulation.

20. The agricultural machine according to claim 1, wherein the first connecting means comprises a first guide track connected to the structure, inside of which guide track a first axis connected to the guiding device can move about the first instantaneous rotation center.

21. The agricultural machine according to claim 1, wherein the second connecting means comprises a second connecting rod connected to the structure by a third articulation and to the guiding device by a fourth articulation, and that the second instantaneous rotation center is constituted by a center of the third articulation.

22. The agricultural machine according to claim 1, wherein the second connecting means comprises a second guide track connected to the structure, inside of which second guide track a second axis connected to the guiding device can move about the second instantaneous rotation center.

23. The agricultural machine according to claim 1, wherein the displacement device can be kept in the first and second positions by means of an adjustment device with direct or remote control.

24. The agricultural machine according to claim 23, wherein the displacement device can also be kept, by means of the adjustment device, in at least one intermediate position comprised between the first and second positions.

25. The agricultural machine according to claim 1, wherein the structure comprises at least one arm carrying the displacement device, which arm is articulated with respect to the frame by means of a substantially horizontal axis, about which axis the arm can pivot upwards by a certain angle.

26. The agricultural machine according to claim 25, wherein the arm extends over the processing device.

\* \* \* \* \*